(12) United States Patent
Tani (10) Patent No.: US 8,982,457 B2
(45) Date of Patent: Mar. 17, 2015

(54) MICROSCOPE SYSTEM AND ILLUMINATION INTENSITY ADJUSTING METHOD

(75) Inventor: Yosuke Tani, Kokubunji (JP)

(73) Assignee: Olympus Corporation, Tokyo (JP)

( * ) Notice: Subject to any disclaimer, the term of this patent is extended or adjusted under 35 U.S.C. 154(b) by 218 days.

(21) Appl. No.: 13/615,561

(22) Filed: Sep. 13, 2012

(65) Prior Publication Data

US 2013/0077159 A1 Mar. 28, 2013

(30) Foreign Application Priority Data

Sep. 27, 2011 (JP) ................................. 2011-211433

(51) Int. Cl.
*G02B 21/10* (2006.01)
*G02B 21/12* (2006.01)

(52) U.S. Cl.
CPC ................................... *G02B 21/125* (2013.01)
USPC ....................................................... 359/385

(58) Field of Classification Search
USPC ................................................. 359/385, 387
See application file for complete search history.

(56) References Cited

U.S. PATENT DOCUMENTS

| | | | | |
|---|---|---|---|---|
| 5,703,714 A | * | 12/1997 | Kojima ........................ | 359/368 |
| 6,867,424 B2 | | 3/2005 | Kurosawa et al. | |
| 7,832,894 B2 | * | 11/2010 | Rudolph et al. ............. | 362/231 |
| 2004/0080817 A1 | * | 4/2004 | Yamaguchi ................... | 359/385 |
| 2005/0243414 A1 | * | 11/2005 | Masuyama ................... | 359/387 |
| 2005/0248839 A1 | * | 11/2005 | Yamaguchi ................... | 359/385 |
| 2011/0317259 A1 | * | 12/2011 | Tanabe et al. ................. | 359/383 |

FOREIGN PATENT DOCUMENTS

JP 2003-149169 A 5/2003

* cited by examiner

*Primary Examiner* — Frank Font
(74) *Attorney, Agent, or Firm* — Holtz, Holtz, Goodman & Chick PC (57) ABSTRACT

A microscope system and an illumination intensity adjusting method that can automatically adjust an illumination intensity when a bright-field illumination system and a dark-field illumination system are simultaneously used are provided. The microscope system includes: a stage on which a specimen is placed; an objective lens that converges observation light from at least the specimen S on the stage; a bright-field illumination unit configured to emit bright-field illumination light that is illumination light aperture to the specimen for a bright-field observation; a dark-field illumination unit configured to emit dark-field illumination light that is illumination light aperture to the specimen for a dark-field observation; and an illumination intensity control unit configured to adjust an illumination intensity of at least one of the bright-field illumination light and the dark-field illumination light according to the illumination intensity of the other one.

6 Claims, 8 Drawing Sheets

MICROSCOPE SYSTEM AND ILLUMINATION INTENSITY ADJUSTING METHOD

CROSS-REFERENCE TO RELATED APPLICATIONS

This application is based upon and claims the benefit of priority from Japanese Patent Application No. 2011-211433 filed on Sep. 27, 2011, the entire contents of which are incorporated herein by reference.

BACKGROUND OF THE INVENTION

1. Field of the Invention

The present invention relates to, for example, a microscope system that irradiates a specimen with illumination light, and acquires a specimen image formed based upon light reflected from the specimen, and an illumination intensity adjusting method for adjusting an illumination intensity of illumination light employed for the microscope system.

2. Description of the Related Art

A microscope system using a microscope apparatus that irradiates a specimen with light for an observation of the specimen has conventionally been used for an observation of a cell, and the like in a field of medicine or in a field of biology. In an industrial field, a microscope apparatus has also been used for various purposes, including a quality control of a metal structure, a research and development of a new material, and a test of an electronic device and a magnetic head. As a method of observing a specimen by use of a microscope system, there have been known a method in which the specimen is visually observed, and a method in which a specimen image is captured by using an imaging device such as a CCD camera, and the captured image is displayed on a monitor.

The observation method by use of the microscope system includes a bright-field observation and a dark-field observation. The bright-field observation is the most popular observation method. In this method, illumination light is applied to a specimen in a direction parallel to an optical axis of an objective lens, by which a contrast of an image is acquired based upon a difference in light transmittance, reflectivity, and color to form a specimen image, and then, an observer observes the specimen image. On the other hand, in the dark-field observation, illumination light that tilts with respect to the optical axis of the objective lens is applied to the specimen, by which the light passing through the specimen or reflected from the specimen (observation light) is acquired to form a specimen image, and then, the observer observes the specimen image. In the dark-field observation, refracting light that passes through the specimen and refracts, or scattering light that is reflected from the specimen and scatters, is used as the observation light to form the specimen image.

When the specimen is observed by selectively using the bright-field observation and the dark-field observation depending on the specimen, or when the specimen is observed by both the bright-field observation and the dark-field observation, the specimen can be magnified and observed, or the shape of the specimen can be observed. Since the dark-field observation can apply a contrast to a low-contrast specimen that is difficult to be observed in the bright field, in particular, the dark-field observation is suitable for an observation of a concavo-convex shape on the specimen, such as a flaw, in the industrial field, for example.

Japanese Unexamined Patent Publication No. 2003-149169 discloses a wafer defect examining device including a bright-field illumination system and a dark-field illumination system as a microscope system that can perform the above-mentioned bright-field observation and the dark-field observation. In the wafer defect examining device, the illumination system to be used is switched between the bright-field illumination system and the dark-field illumination system, or the bright-field illumination system and the dark-field illumination system are simultaneously used, whereby specimen images acquired by the respective illumination systems can be observed.

SUMMARY OF THE INVENTION

A microscope system according to an aspect of the present invention includes: a stage on which a specimen is placed; an objective lens that converges observation light from at least the specimen on the stage; a bright-field illumination unit configured to emit bright-field illumination light that is illumination light applied to the specimen for a bright-field observation; a dark-field illumination unit configured to emit dark-field illumination light that is illumination light applied to the specimen for a dark-field observation; and an illumination intensity control unit configured to adjust an illumination intensity of at least one of the bright-field illumination light and the dark-field illumination light according to the illumination intensity of the other one.

An illumination intensity adjusting method according to another aspect of the present invention includes: irradiating a specimen on a stage, on which the specimen is placed, with dark-field illumination light that is illumination light for a dark-field observation to capture the specimen; irradiating the specimen with bright-field illumination light that is illumination light for a bright-field observation and to capture the specimen; and adjusting at least one of the illumination lights according to the illumination intensity of the other illumination light based upon a ratio of exposure times when the specimen is captured in the dark-field imaging and when the specimen is captured in the bright-field imaging.

The above and other features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Embodiments of the present invention will be described below with reference to the attached drawings. The present invention is not limited to the embodiments described below. In the description below, the respective drawings only illustrate schematically a shape, size, and positional relationship to an extent in which the present invention can be understood, and therefore, the present invention is not limited only to the shape, size, and positional relationship illustrated in the drawings. In each of the drawings, some hatching is not illustrated in a cross-section in order to clarify the structure. Numerical values described later are only preferable examples of the present invention, and the present invention is not limited to the described numerical values.

First Embodiment

Figure 1:
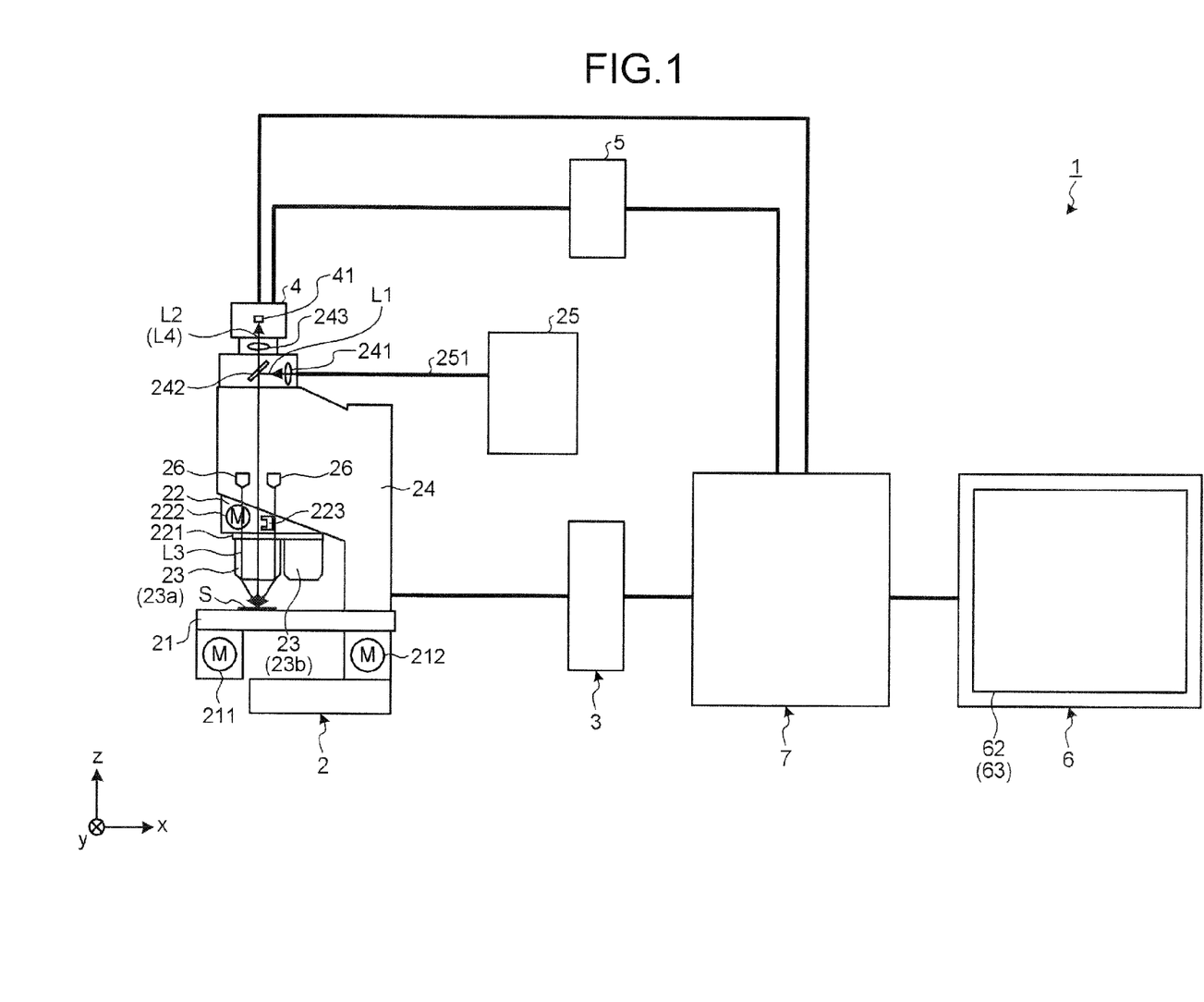
FIG. 1 is a conceptual view illustrating an example of a microscope system according to a first embodiment of the present invention.
Figure 2:
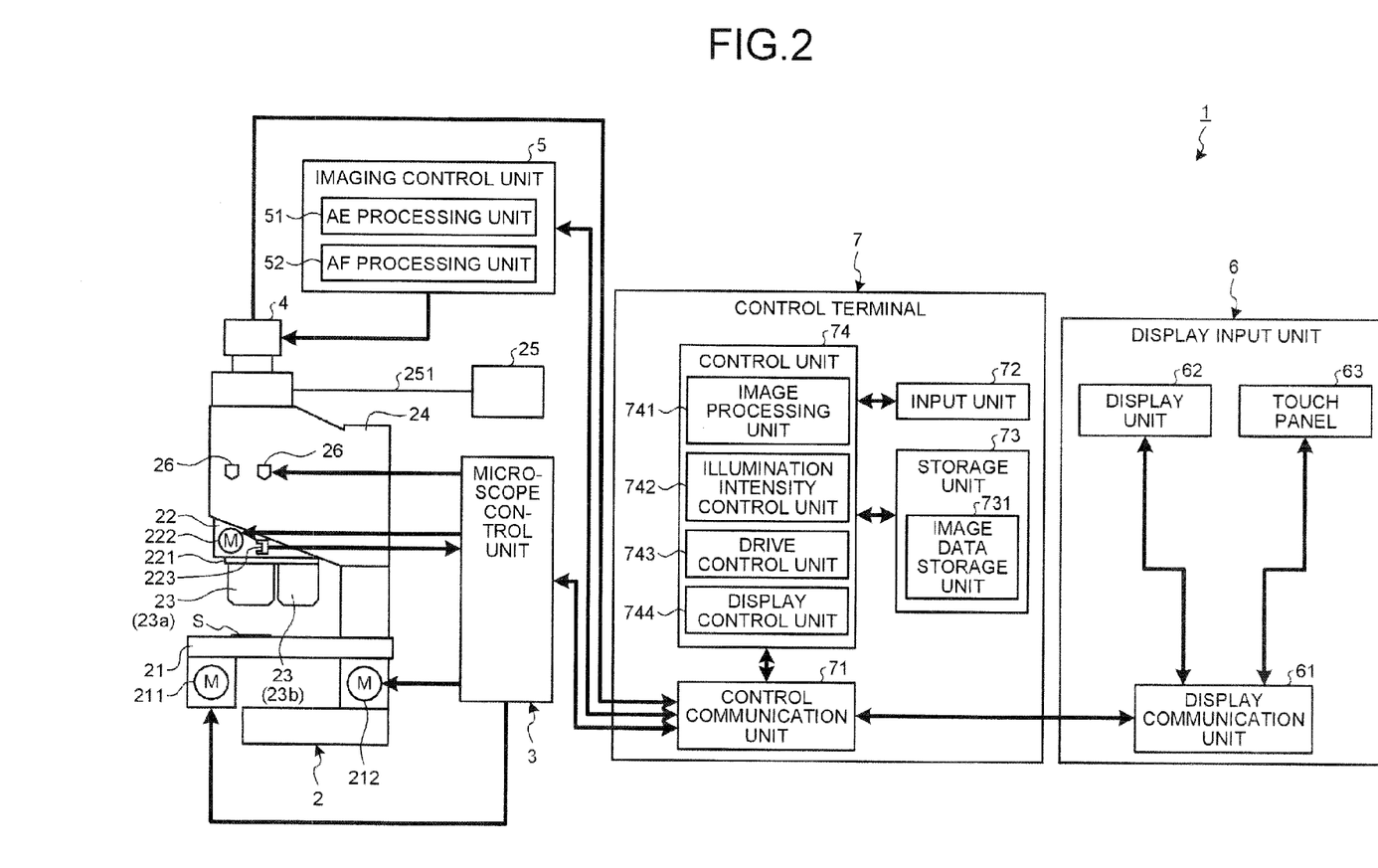
FIG. 2 is a block diagram illustrating a functional configuration of the microscope system according to the first embodiment of the present invention.

FIG. 1 is a conceptual view illustrating an example of a configuration of a microscope system according to a first embodiment of the present invention. FIG. 2 is a block diagram illustrating a functional configuration of the microscope system according to the first embodiment. In FIGS. 1 and 2, a plane on which the microscope system 1 is placed is defined as XY plane, and a direction perpendicular to the XY plane is defined as Z direction.

As illustrated in FIGS. 1 and 2, the microscope system 1 includes a microscope apparatus 2 that observes a specimen S, a microscope control unit that drives and controls the microscope apparatus 2, an imaging apparatus 4 that captures the specimen S through the microscope apparatus 2 and generates image data, an imaging control unit 5 that controls the drive of the imaging apparatus 4, a display input unit 6 that displays an image corresponding to the image data captured by the imaging apparatus 4 through a control terminal 7 and accepts an input of various operations of the microscope system 1, and the control terminal 7 that controls the microscope control unit 3, the imaging control unit 5, and the display input unit 6. The microscope apparatus 2, the microscope control unit 3, the imaging apparatus 4, the imaging control unit 5, the display input unit 6, and the control terminal 7 are connected wirelessly or with wire in order that data can be received and transmitted.

The microscope apparatus 2 includes a stage 21 on which the specimen S is placed, a microscope body 24 that has generally a C-shape as viewed from a side face, that supports the stage 21, and that holds an objective lens 23 via a revolver 22, a bright-field illumination unit 25 that emits bright-field illumination light that is illumination light applied to the specimen S for a bright-field observation, and a dark-field illumination unit 26 that is provided in the microscope body 24 and emits dark-field illumination light that is illumination light applied to the specimen S for a dark-field observation.

The stage 21 is configured to be freely movable in the XYZ direction. The stage 21 can freely move in the XY plane by a motor 211. Under the control of the microscope control unit 3, a predetermined position of an origin on the XY plane is detected by an origin sensor, not illustrated, on the XY position and the drive amount of a motor 211 is controlled with the origin position being defined as a reference point, whereby the stage 21 moves on an observation region of the specimen S. The stage 21 outputs a position signal (XY coordinate) related to the X position and the S position during the observation to the microscope control unit 3. The stage 21 can freely move in the Z direction by a motor 212. Under the control of the microscope control unit 3, a predetermined position of an origin in the Z direction of the stage 21 is detected by an origin sensor, not illustrated, on the Z position and the drive amount of a motor 212 is controlled with the origin position being defined as a reference point, whereby the stage 21 moves the specimen S to an arbitrary Z position within a predetermined height range. The stage 21 outputs the position signal related to the Z position during the observation to the microscope control unit 3. The specimen may be moved as being focused not only by moving the stage in the Z direction, but also by vertically moving the objective lens 23 or the observation optical system including the objective lens 23.

The revolver 22 is provided to be slidable or rotatable to the microscope body 24, and moves the objective lens 23 to the position above the specimen S. The revolver 22 is configured by using an electric revolver. The revolver 22 holds plural objective lenses 23, each having different magnification (observation magnification), by a mounter 221. The revolver 22 includes a revolver motor 222 that slides or rotates the mounter 221 in order to selectively change the objective lens 23 that is inserted on an optical path of the observation light to be used for the observation of the specimen S, and a revolver detecting unit 223 that detects a connection state of the revolver 22.

The revolver motor 222 slides or rotates the mounter 221 under the control of the microscope control unit 3. The revolver detecting unit 223 includes a revolver connection sensor (not illustrated) detecting that the revolver 22 is connected to the microscope body 24, a revolver sensor (not illustrated) identifying the type of the objective lens 23 inserted on the optical path of the observation light, and a movement end sensor (not illustrated) detecting that the objective lens 23 is inserted on the optical path of the observation light. The revolver detecting unit 223 outputs the detection results detected by the respective sensors to the microscope control unit 3.

A nosepiece may be employed instead of the revolver 22. The nosepiece can arrange the desired objective lens 23 above the specimen S through a slider that is provided to be slidable in a direction orthogonal to the optical axis of the objective lens 23. The nosepiece holds plural objective lenses 23 (23a, 23b), each having different magnification (observation magnification), by the slider. The nosepiece slides the slider in the X direction under the control of the microscope control unit 3, thereby being capable of selectively changing the objective lens 23 that is inserted on the optical path of the observation light to be used for the observation of the specimen S.

The objective lens 23, mounted to the mounter 221, at least includes an objective lens 23a (hereinafter referred to as "low-powered objective lens 23a") with relatively a low magnification such as ×1 magnification, ×2 magnification, or ×4 magnification, and an objective lens 23b (hereinafter referred to as "high-powered objective lens 23b") with relatively a high magnification such as ×10 magnification, ×20 magnification, or ×40 magnification. The magnifications of the low-powered objective lens 23a and the high-powered objective lens 23b are only illustrative. The magnification of the high-powered objective lens 23b may only be higher than the magnification of the low-powered objective lens 23a.

The microscope body 24 includes, in its inside, an illumination lens 241 that converges illumination light L1 (hereinafter referred to as "bright-field illumination light L1") emitted from the bright-field illumination unit 25 via a fiber 251, a half mirror 242 that deflects an optical axis of the bright-field illumination light L1 along the optical axis of the objective lens 23, and an imaging lens 243 that converges the reflection light from the specimen S incident through the objective lens 23 and the half mirror 242 to image the observation image.

A zoom lens mechanism that magnifies the specimen S is preferably provided between the half mirror 242 and the objective lens 23. The zoom lens mechanism is configured by using, for example, a zoom lens group, and a zoom lens motor driving the zoom lens group. The zoom lens motor can change the magnification of the zoom lens mechanism by moving the zoom lens group along the direction of the optical axis under the control of the microscope control unit 3.

The bright-field illumination unit 25 is configured by using a light source such as a halogen lamp, a xenon lamp, or an LED (Light Emitting Diode). The bright-field illumination unit 25 emits the bright-field illumination light L1 for forming the observation image of the specimen S to the microscope body 24 through the fiber 251.

The bright-field illumination light L1 is applied to the specimen S through the illumination lens 241, the half mirror 242, and the objective lens 23. The reflection light 12 reflected from the specimen S (hereinafter referred to as "observation light L2") is incident on the imaging apparatus 4 through the objective lens 23, the half mirror 242, and the imaging lens 243.

The dark-field illumination unit 26 is realized by using a ring illumination that includes plural annularly-arranged light sources, such as a halogen lamp, a xenon lamp, or an LED. The dark-field illumination unit 26 is provided in order that the bright-field illumination light L1 passes through the annular internal space. The dark-field illumination unit 26 irradiates the specimen S with parallel light flux, which tilts with respect to the optical axis of the objective lens 23 (this light is referred to as "dark-field illumination light L3" below). The reflected light reflected from the specimen S or scattering light reflected from the specimen S (hereinafter referred to as "observation light L4") is incident on the imaging apparatus 4 through the objective lens 23, the half mirror 242, and the imaging lens 243.

Figure 3:
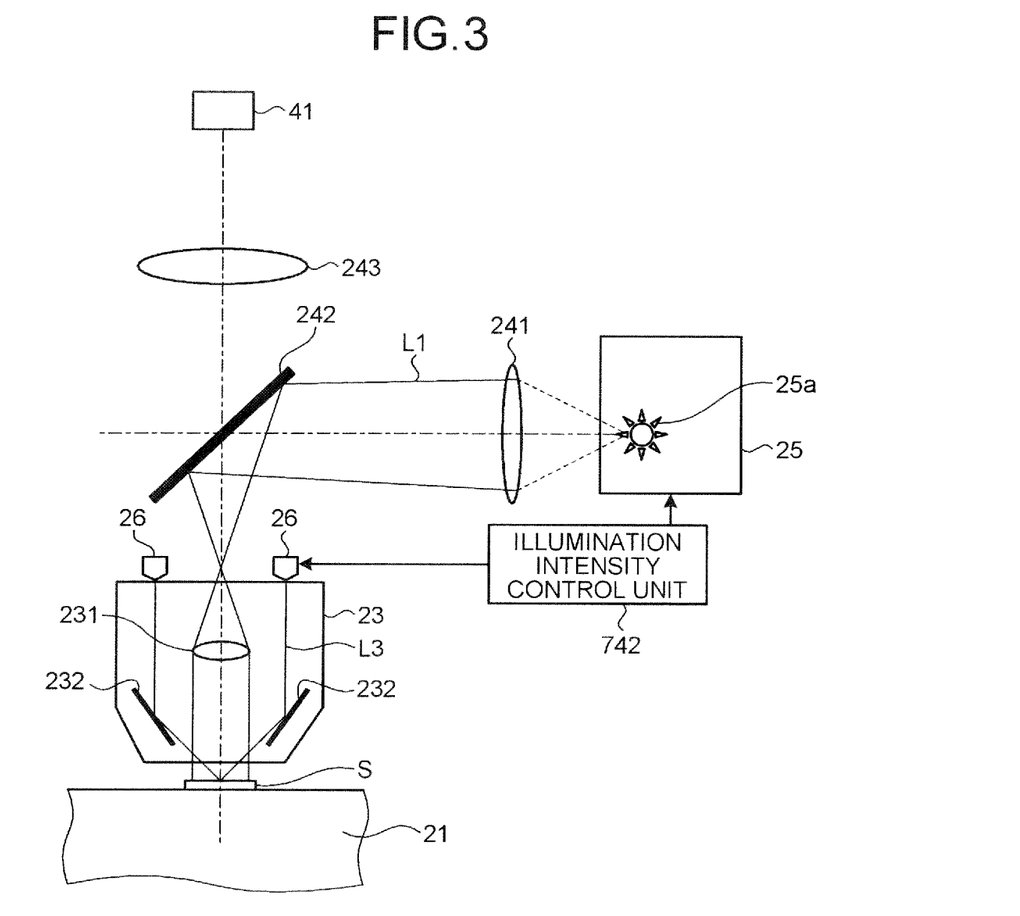
FIG. 3 is a schematic view illustrating an optical system and an illumination system in the microscope system according to the first embodiment of the present invention.

FIG. 3 is a schematic view illustrating the optical system and the illumination system of the microscope system according to the first embodiment. The bright-field illumination light L1 emitted from the light source 25a of the bright-field illumination unit 25 is applied to the specimen S through the illumination lens 241, the half mirror 242, and the objective lens 23 as described above. The dark-field illumination light L3 emitted from the dark-field illumination unit 26 is applied to the specimen S through the objective lens 23 as described above.

The objective lens 23 includes a condenser lens 231 that converges the bright-field illumination light L1, which is deflected along the optical axis of the objective lens 23 by the half mirror 242, to form a parallel light flux, and emits the resultant light flux to the specimen S, as well as converges the light reflected from the specimen S, and a parabolic mirror 232 that tilts the dark-field illumination light L3 emitted from the dark-field illumination unit 26 with respect to the optical axis of the objective lens 23, and emits the resultant light to the specimen S.

The microscope control unit 3 is configured by using a CPU (Central Processing Unit), and entirely controls the operations of the respective units constituting the microscope apparatus 2 under the control of the control terminal 7. Specifically, the microscope control unit 3 performs a changeover process in which the microscope control unit 3 drives the revolver motor 222 to slide or rotate the mounter 221, in order to change the objective lens 23 that is to be arranged on the optical path of the observation light L2, a driving process of driving the stage 21 by driving the motor 211 or the motor 212, and an adjusting process for adjusting the respective units of the microscope apparatus 2 involved with the observation of the specimen S. The microscope control unit 3 also adjusts a light quantity of the bright-field illumination unit 25 and the dark-field illumination unit 26 under the control of the control terminal 7. The microscope control unit 3 outputs the condition of each unit constituting the microscope apparatus 2, e.g., the position information (XY position, Z position) of the stage 21 and the type information of the objective lens 23 attached to the revolver 22, to the control terminal 7.

The imaging apparatus 4 is configured by using an image sensor 41 such as a COD (Charge Coupled Device) or CMOS (Complementary Metal Oxide Semiconductor). The imaging apparatus 4 captures the observation image of the specimen S incident through the imaging lens 243 so as to continuously generate image data of the specimen S under the control of the imaging control unit 5. The imaging apparatus 4 outputs the generated image data of the specimen S to the control terminal 7 through a camera cable. In the present embodiment, the imaging apparatus 4 serves as an imaging unit.

The imaging control unit 5 is configured by using a CPU, and controls the operation of the imaging apparatus 4. Specifically, the imaging control unit 5 executes an ON/OFF changeover process of an automatic gain control of the imaging apparatus 4, a gain setting process, and a frame-rate setting process, so as to control the shooting operation of the imaging apparatus 4. The imaging control unit 5 includes an AE processing unit 51 and an AF processing unit 52.

The AE (Automatic Exposure) processing unit 51 automatically sets an exposure condition of the imaging apparatus 4 based upon the image data generated by the imaging apparatus 4. Specifically, the AK processing unit 51 calculates brightness from the image data acquired through the control terminal 7, and determines the exposure condition of the imaging apparatus 4, such as an exposure time, thereby performing an automatic exposure of the imaging apparatus 4.

The AF processing unit 52 automatically makes a focus adjustment of the imaging apparatus 4 based upon the image data generated by the imaging apparatus 4. Specifically, the AF processing unit 52 evaluates a contrast included in the image data, and detects a focused position (focus position), thereby automatically making a focus adjustment of the imaging apparatus 4. The AF processing unit 52 may detect the focused position (Z position) by evaluating a contrast of an image on each Z position of the stage 21.

The display input unit 6 includes a display communication unit 61 that establishes communication with the control terminal 7, a display unit 62 that displays an image, and a touch panel 63 that outputs a position signal according to an external contact of an object.

The display communication unit 61 is a communication interface for establishing communication with the control terminal 7. The display communication unit 61 outputs the image data outputted from the control terminal 7 to the display unit 62.

The display unit 62 is configured by using a display panel such as a liquid crystal panel or an organic EL (Electro Luminescence) panel. The display unit 62 displays an image corresponding to the image data inputted through the display communication unit 61. The display unit 62 displays various operation information of the microscope system 1.

Figure 4:
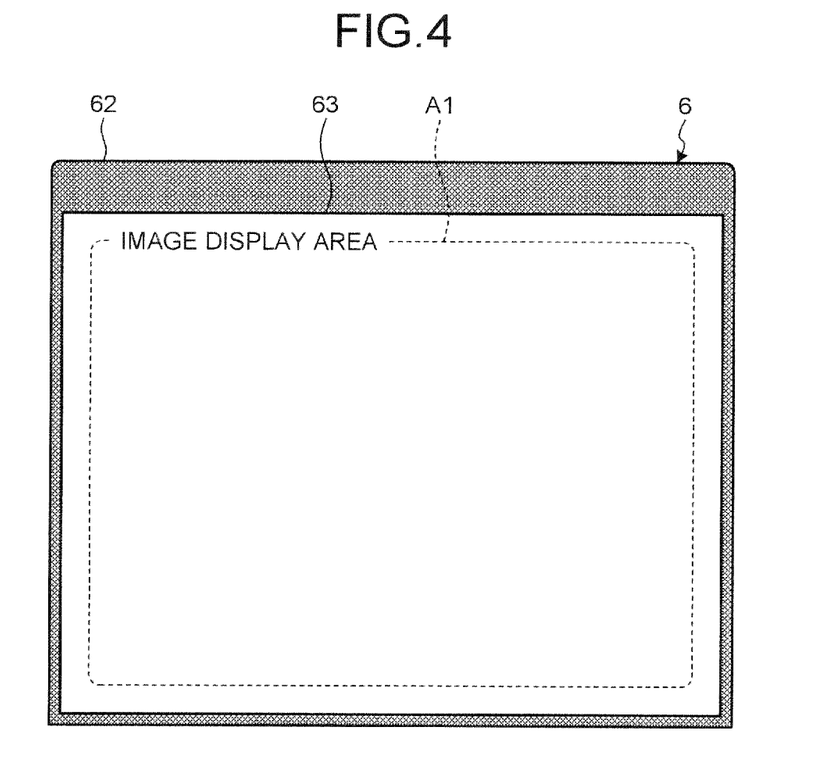
FIG. 4 is a view illustrating an example of a display input unit of the microscope system according to the first embodiment of the present invention.

The touch panel 63 is provided on a display screen of the display unit 62, and accepts an input according to the external contact position of the object. Specifically, the touch panel 63 detects a position touched by a user in accordance with an operation icon displayed on the display unit 62, and outputs the position signal according to the detected touch position to the control terminal 7 through the display communication unit 61. For example, the touch panel 63 serves as a graphical user interface (GUI) as illustrated in FIG. 4, wherein the display unit 62 displays the various operation information of the microscope system 1, a live image corresponding to the image data continuously generated by the imaging apparatus 4, or a captured image captured by the imaging apparatus 4 in an image display area A1. In general, the touch panel employs a resistive type, a capacitive type, or optical type. In the first embodiment, any type of touch panel can be used.

The control terminal 7 includes a control communication unit 71 that establishes communication with the microscope control unit 3, the imaging control unit 5, and the display input unit 6, a storage unit 73 that stores various information of the microscope system 1, an input unit 72 that accepts an input of a drive command signal instructing to drive the respective units, and a control unit 74 that controls the respective units of the microscope system 1.

The control communication unit 71 is a communication interface that establishes communication with the microscope control unit 3, the imaging control unit 5, and the display input unit 6. The control communication unit 71 also outputs the image data, outputted from the imaging apparatus 4, to the control unit 74 through the camera cable.

The input unit 72 is configured by using a keyboard, a mouse, a joystick, and various switches, and it outputs an operation signal according to the operation inputs of the various switches to the control unit 74.

The storage unit 73 is realized by using a flash memory fixedly mounted in the control terminal 7, or a semiconductor memory such as a RAM (Random Access Memory). The storage unit 73 stores various programs executed by the microscope system 1, and various data used during the execution of the program. The storage unit 73 also temporarily stores the information that is currently processed by the control unit 74. The storage unit 73 includes an image data storage unit 731 that stores the image data captured by the imaging apparatus 4. The storage unit 73 also temporarily stores the position signal indicating the contact position inputted from the touch panel 63 of the display input unit 6. The storage unit 73 may be configured by using a memory card that is externally mounted.

The control unit 74 is configured by using a CPU. The control unit 74 entirely controls the microscope system 1 through the instruction corresponding to the respective units constituting the microscope system 1 or the data transfer, according to the drive command signal, the position signal, and the changeover signal from the input unit 72 and the touch panel 63.

The control unit 74 includes an image processing unit 741, an illumination intensity control unit 742, a drive control unit 743, and a display control unit 744.

The image processing unit 741 performs a predetermined image process to the image data inputted through the control communication unit 71, thereby generating a display image displayed on the display unit 62. Specifically, the image processing unit 741 performs the image process, including an optical black subtracting process, a white balance adjusting process, a synchronization process, a color matrix calculation process, a γ correction process, a color reproduction process, and an edge enhancement process, to the image data. The image processing unit 741 compresses the image data according to a predetermined system, e.g., JPEG (Joint Photographic Experts Group) system, and outputs the compressed image data to the image data storage unit 731.

The illumination intensity control unit 742 outputs a control signal for adjusting the illumination intensity of the bright-field illumination unit 25 and the dark-field illumination unit 26 to the microscope control unit 3 so as to control the illumination intensity of the bright-field illumination unit 25 and the dark-field illumination unit 26.

The drive control unit 743 acquires the position information that is stored in the storage unit 73 when the touch panel 63 stops after it outputs the position signal, and outputs a drive signal for driving an electric unit constituting the microscope apparatus 2 based upon the position information.

The display control unit 744 controls a display manner of the display unit 62. Specifically, the display control unit 744 allows the display unit 62 to display the respective images of the plural image data stored in the image data storage unit 731 through the control communication unit 71 and the display communication unit 61. The display control unit 744 allows the display unit 62 to display the operation information involved with the respective operations of the microscope system 1, e.g., the operation information of the stage 21, through the control communication unit 71 and the display communication unit 61.

The microscope system 1 thus configured displays the image data of the specimen S, captured by the imaging apparatus 4, on the display unit 62 through the control communication unit 71 and the display communication unit 61 under the control of the control unit 74, whereby the user can observe the image of the specimen S. The microscope system 1 also drives the microscope apparatus 2 and the imaging apparatus 4, since the control unit 74 outputs the command signal and drive signal to the respective units of the microscope system 1 based upon the signal inputted from the input unit 72 or the touch panel 63.

Figure 5:
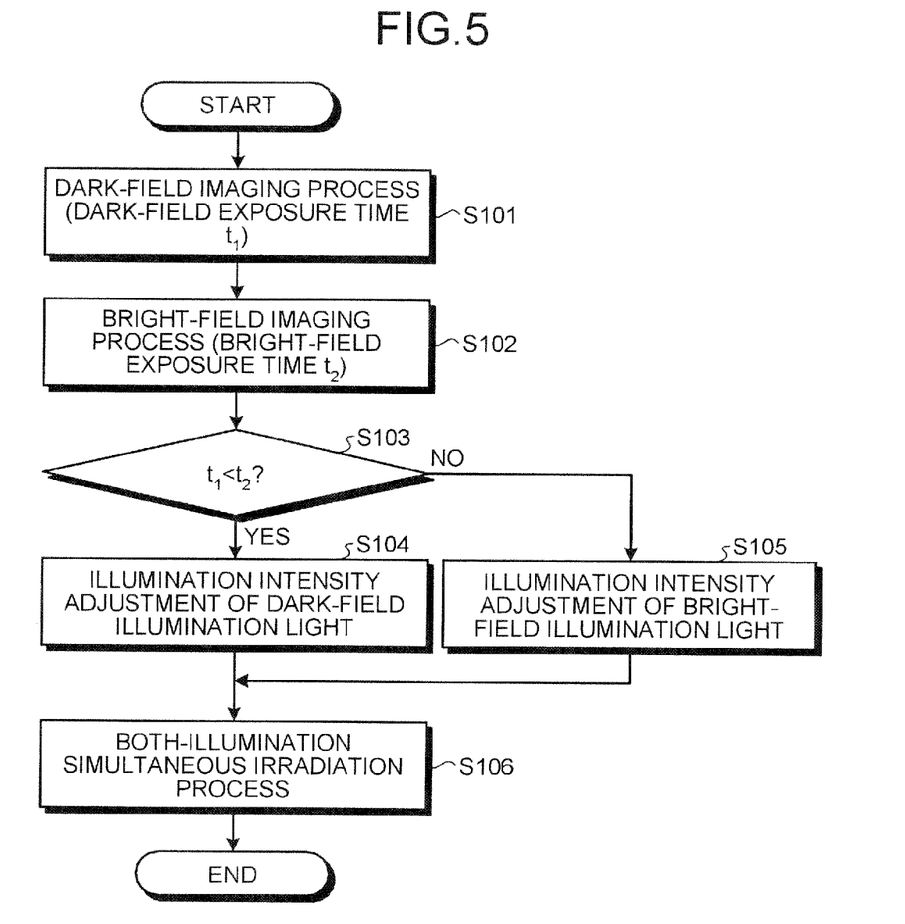
FIG. 5 is a flowchart illustrating an outline of a process executed by the microscope system according to the first embodiment of the present invention.

Subsequently, an illumination adjusting method will be described. FIG. 5 is a flowchart illustrating an outline of the illumination intensity adjusting method executed by the microscope system 1 according to the first embodiment. In the process described below, it is supposed that the illumination intensity is to be adjusted in such a manner that a ratio of the brightness of the bright-field illumination light and the brightness of the dark-field illumination light becomes 1:1.

Firstly, the control unit 74 allows the imaging control unit 5 to execute the dark-field imaging process to the specimen S on the stage 21, and acquires a dark-field exposure time $t_1$, which is the exposure time in the imaging process, from the AE processing unit 51 (step S101). Thereafter, the control unit 74 allows the imaging control unit 5 to execute the bright-field imaging process to the specimen S on the stage 21, and acquires a bright-field exposure time $t_2$, which is the exposure time in the imaging process, from the AE processing unit 51 (step S102). The dark-field imaging process and the bright-field imaging process may be executed in the reverse order.

The AE exposure time is calculated based upon, for example, brightness information of a subject included in the image data, a shooting sensitivity of the image sensor 41, and a set value. The set value may be a value corresponding to an average value of the brightness corresponding to one frame, may be a value corresponding to the highest brightness value, or may be a value corresponding to an average brightness value of a predetermined region. The method of calculating the AE time may be changed depending upon the dark-field imaging process in step S101 and the bright-field imaging process in step S102.

When acquiring the dark-field exposure time $t_1$ and the bright-field exposure time $t_2$, the control unit 74 gives an instruction to the illumination intensity control unit 742 to adjust the illumination intensity. The illumination intensity control unit 742 compares the dark-field exposure time $t_1$ and the bright-field exposure time $t_2$ so as to determine which one is longer (step S103). When the illumination intensity control unit 742 determines that the bright-field exposure time $t_2$ is longer than the dark-field exposure time $t_1$ (step S103: Yes), it adjusts the illumination intensity of the dark-field illumination light L3 (step S104).

On the other hand, when the illumination intensity control unit 742 determines that the dark-field exposure time $t_1$ is longer than the bright-field exposure time $t_2$ (step S103: No), it adjusts the illumination intensity of the bright-field illumination light L1 (step S105).

The adjustment of the illumination intensity will be described here. When the bright-field exposure time $t_2$ is longer than the dark-field exposure time $t_1$, for example, the illumination intensity control unit 742 calculates a ratio $(t_1/t_2)$ of the dark-field exposure time $t_1$ and the bright-field exposure time $t_2$. The illumination intensity control unit 742 decreases the quantity of light emitted from the light source according to the ratio $(t_1/t_2)$, thereby decreasing the illumination intensity of the dark-field illumination unit 26. Similarly, when the dark-field exposure time $t_1$ is longer than the bright-field exposure time $t_2$, the illumination intensity control unit 742 calculates a ratio $(t_2/t_1)$ of the bright-field exposure time $t_2$ and the dark-field exposure time $t_1$. The illumination intensity control unit 742 decreases the quantity of light emitted from the light source according to the ratio $(t_2/t_1)$, thereby decreasing the illumination intensity of the bright-field illumination unit 25.

The control unit 74 adjusts the illumination intensity by the illumination intensity control unit 742 in step S104 or step S105, and then, executes a both-illumination simultaneous irradiation process by using the adjusted bright-field illumination light L1 and the adjusted dark-field illumination light L3 (step S106).

When the bright-field illumination light and the dark-field illumination light are simultaneously applied to the specimen in the illumination intensity adjusting process described above, the illumination intensity of one of the illumination lights is relatively made small (the illumination light is dimmed) according to the ratio of the exposure time in order to match the brightness of the bright-field illumination light and the brightness of the dark-field illumination light, whereby the illumination intensity can automatically be adjusted. Electric power outputted to the light source is adjusted, for example, for adjusting the illumination intensity.

According to the above-mentioned first embodiment, the illumination intensity of the illumination light whose exposure time is shorter is relatively decreased according to the ratio of the exposure time of the bright-field illumination light and the exposure time of the dark-field illumination light. Therefore, the illumination intensity can automatically be adjusted in case where the bright-field illumination system and the dark-field illumination system are simultaneously used. By virtue of this configuration, the specimen to which the bright-field illumination light and the dark-field illumination light are simultaneously applied can be observed with the most appropriate illumination intensity.

According to the above-mentioned first embodiment, the specimen image is acquired by applying the bright-field illumination light and the dark-field illumination light with the most appropriate illumination intensity, whereby a clearer image can be obtained, compared to the case where an all-focused image or three-dimensional image is constructed from the specimen image by the irradiation of one of the bright-field illumination light and the dark-field illumination light. A clearer image can be obtained by using the dark-field illumination system, when an all-focused image or three-dimensional image of a specimen, having a surface tilting to the optical axis of the objective lens, is constructed.

In the above-mentioned illumination intensity adjusting process, the ratio of the brightness of the bright-field illumination light and the brightness of the dark-field illumination light becomes 1:1. However, an observer may preliminarily set the adjustment ratio, and the illumination intensity adjusting process may be executed based upon the set ratio. Alternatively, the adjustment ratio may be set according to the specimen. In this case, the illumination intensity is adjusted by using the set adjustment ratio and the above-mentioned exposure time.

Second Embodiment

Figure 6:
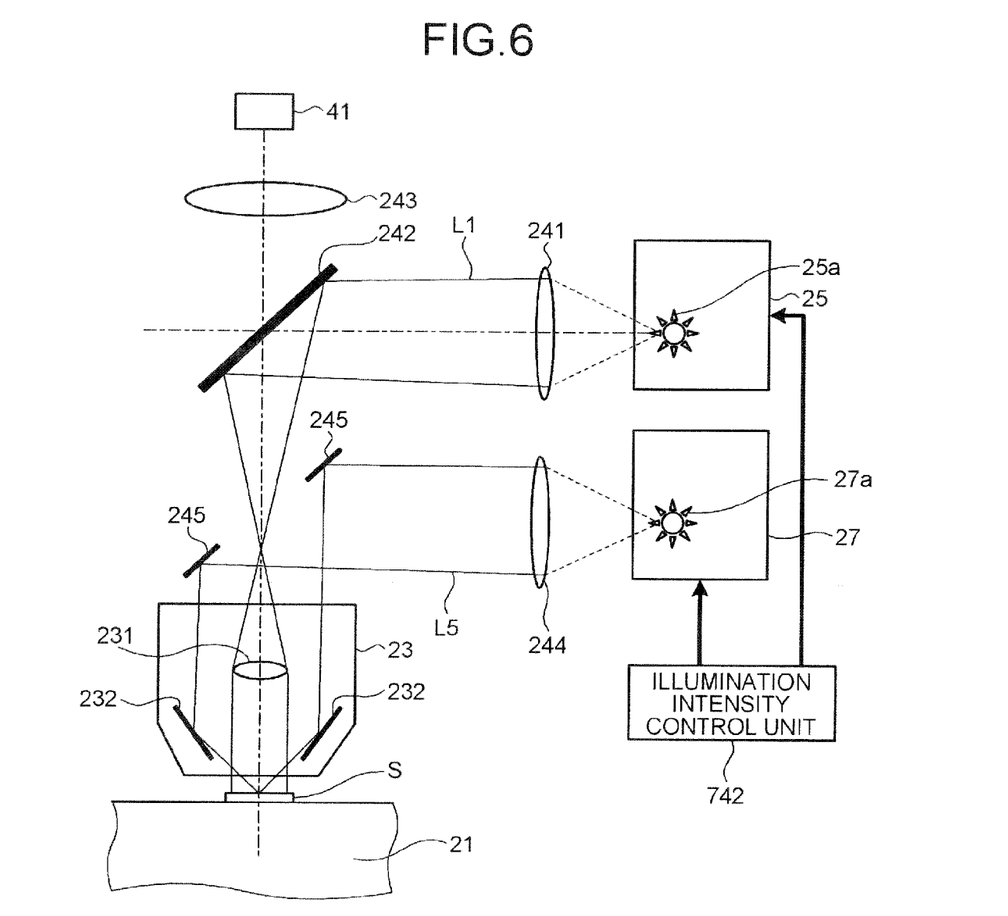
FIG. 6 is a schematic view illustrating an optical system and an illumination system in a microscope system according to a second embodiment of the present invention.

Subsequently, a second embodiment of the present invention will be described. FIG. 6 is a schematic view illustrating an optical system and an illumination system of a microscope system according to the second embodiment. Only the illumination system in the microscope system according to the second embodiment is different from that in the microscope system according to the first embodiment, and the configuration of the microscope system according to the second embodiment is the same as that of the microscope system according to the first embodiment. Therefore, the illumination system and the optical system in the microscope system according to the second embodiment of the present invention will be described below. The components same as those in FIG. 3 are identified by the same numerals.

The microscope system according to the second embodiment includes a dark-field illumination unit 27 having a light source 27a like the light source 25a in the bright-field illumination unit 25 described above, instead of the annular dark-field illumination unit 26 including plural annularly-arranged light sources, for example, as illustrated in FIG. 3.

The microscope system according to the second embodiment has an illumination lens 244 that converges illumination light (hereinafter referred to as "dark-field illumination light L5") emitted from the dark-field illumination unit 27, and a ring mirror 245 that has generally a disk-like shape and that has an aperture on its center. The ring mirror 245 is provided at the position where it reflects the light at the end out of the dark-field illumination light L5 converged by the illumination lens 244, and it passes the illumination light L1 emitted from the bright-field illumination unit 25 through the aperture at its center.

The dark-field illumination light L5 deflected along the optical axis of the objective lens 23 by the ring mirror 245 is emitted to the specimen S as being tilted to the optical axis of the objective lens 23 by the parabolic mirror 232.

According to the second embodiment described above, the illumination intensity of the illumination light whose exposure time is shorter is relatively decreased according to the ratio of the exposure time of the bright-field illumination light and the exposure time of the dark-field illumination light, as in the first embodiment. Therefore, the illumination intensity can automatically be adjusted in case where the bright-field illumination system and the dark-field illumination system are simultaneously used. By virtue of this configuration, the specimen to which the bright-field illumination light and the dark-field illumination light are simultaneously applied can be observed with the most appropriate illumination intensity.

In the second embodiment described above, the light source for the dark-field illumination is provided at the outside of the microscope body. Therefore, when the light source is exchanged, it is unnecessary to open the microscope body for the exchange of the light source, resulting in that the process for exchanging the light source can be facilitated more.

Figure 7:
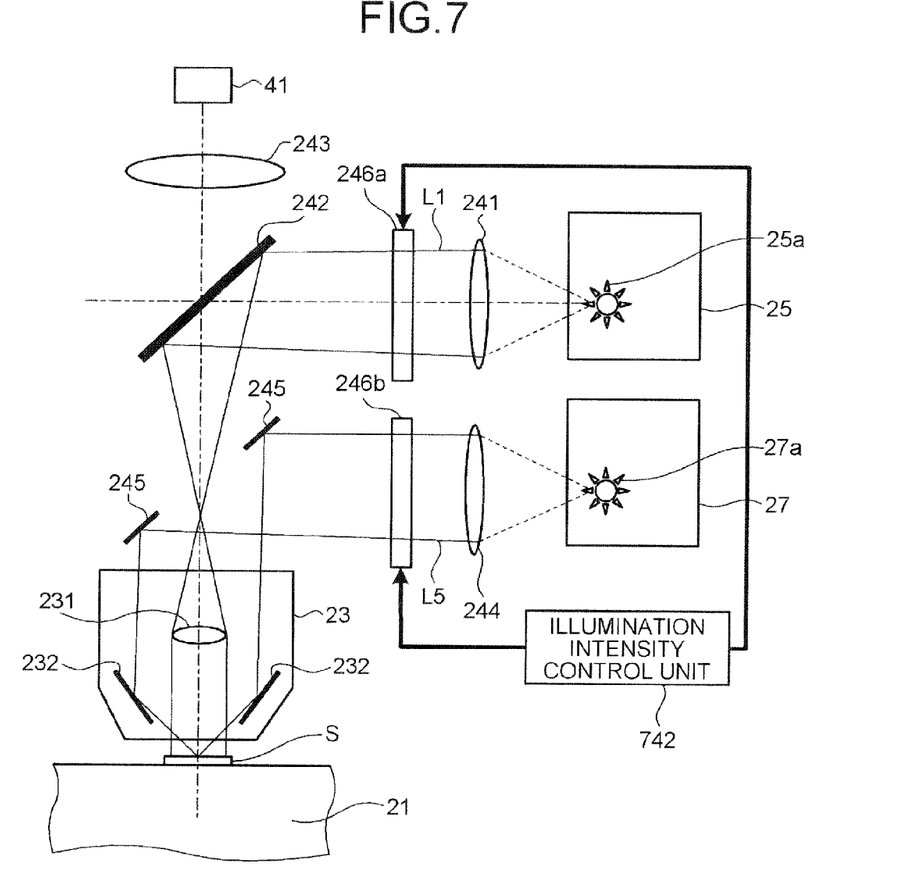
FIG. 7 is a schematic view illustrating an optical system and an illumination system in a microscope system according to a modification of the second embodiment of the present invention.

FIG. 7 is a schematic view illustrating an optical system and an illumination system of a microscope system according to a modification of the second embodiment. As in the modification illustrated in FIG. 7, the illumination intensity, which is adjusted by the illumination intensity control unit 742, may be adjusted by using variable ND filters 246a and 246b that can adjust a quantity of transmitted light, without adjusting the light quantity of the light source.

Figure 8:
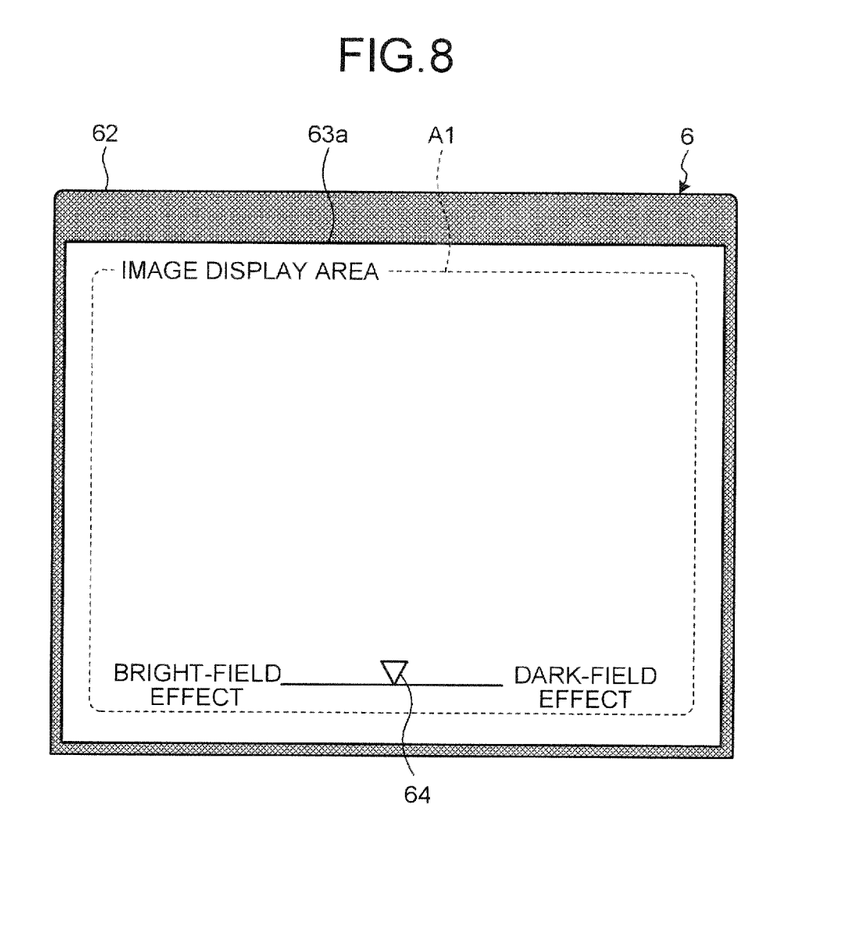
FIG. 8 is a view illustrating an example of a display input unit of a microscope system according to a third embodiment of the present invention.

When adjusting the illumination intensity of the illumination light, the illumination intensity control unit 742 adjusts the illumination intensity of one of the bright-field illumination light and the dark-field illumination light according to the ratio of the exposure time of the bright-field illumination light and the exposure time of the dark-field illumination light, as described above. The illumination intensity control unit 742 adjusts the quantity of the transmitted light through the control of the variable ND filter 246a or 246b that is provided near the illumination light to be adjusted, thereby adjusting the illumination intensity, Third Embodiment Subsequently, a third embodiment of the present invention will be described. FIG. 8 is a view illustrating an example of a display input unit of a microscope system according to the third embodiment. Only the display manner by the display unit 62 in the microscope system according to the third embodiment is different from that in the microscope systems according to the embodiments described above, and the configuration of the microscope system according to the third embodiment is the same as that of the microscope systems according to the embodiments described above. Therefore, only the display manner by the display unit 62 in the microscope system according to the third embodiment of the present invention will be described below.

A touch panel 63a serves as a graphical user interface (GUI), wherein the display unit 62 displays a live image corresponding to the image data continuously generated by the imaging apparatus 4, or a captured image captured by the imaging apparatus 4, in an image display area A1. The display unit 62 displays a slider 64 that adjusts a ratio of the bright field effect by the bright-field illumination and the dark-field effect by the dark-field illumination to the captured image in the image display area A1.

The illumination intensity control unit 742 adjusts the illumination intensity of the bright-field illumination light or the dark-field illumination light according to the position of the slider 64 that is moved by the input operation of the observer. For example, when the slider 64 is located near the bright-field effect, the illumination intensity control unit 742 increases the ratio (the ratio of the illumination intensity of the bright-field illumination light to the illumination intensity of the dark-field illumination light) of the bright-field effect of the image displayed on the image display area. The illumination intensity may be adjusted in such a manner that one of the illumination intensities is fixed, and the other one is decreased. Alternatively, the illumination intensity may be adjusted in such a manner that one of the illumination intensities is fixed, and the other one is increased. Alternatively, the illumination intensity may be adjusted in such a manner that both illumination intensities may relatively be adjusted according to the ratio.

When the slider 64 is located on the middle between the bright-field effect and the dark-field effect, the illumination intensity of the bright-field illumination and the illumination intensity of the dark-field illumination are set to be the optimum intensities adjusted by the illumination intensity adjusting process described above.

According to the third embodiment described above, the illumination intensity of the illumination light whose exposure time is shorter is relatively decreased according to the ratio of the exposure time of the bright-field illumination light and the exposure time of the dark-field illumination light, as in the first embodiment. Therefore, the illumination intensity can automatically be adjusted in case where the bright field illumination system and the dark-field illumination system are simultaneously used. In addition, the observer can intuitively adjust the ratio of the illumination intensity of the bright-field illumination light and the illumination intensity of the dark-field illumination light based upon the image, which is formed with the optimum illumination intensity, for the observation of the specimen image. In this case, the observer can adjust the illumination intensity with the image formed with the optimum illumination intensity being used as a start, whereby the time taken for the operation of confirming the specimen image can be shortened.

In the above description, the unit used to adjust the bright-field effect and the dark-field effect by the observer is the GUI. However, a slider may be operated by use of a mouse to make an input command, or a mechanical structure such as an adjust knob or input button may be used to make an input command. In this case, the input unit 72 outputs command information to the illumination intensity control unit 742 according to the input by the adjust knob or the input button.

Alternatively, the observer may preliminarily move the slider 64 to set the adjustment ratio of the bright-field effect and the dark-field effect, and execute the above-mentioned illumination intensity adjusting process based upon the set ratio.

In the embodiments described above, the light source of the dark-field illumination light is not only white but also may be other color. In this case, the color of the light source is preferably a color (complementary color) that can be easily distinguished from the bright-field illumination light, such as a color according to the specimen, e.g., a complementary color to the specimen.

In the embodiments described above, the dark-field illumination light may be turned on at all times, or may be flickered at a predetermined interval. The predetermined interval is an interval according to a frame interval of capturing an image, for example. The specimen image by the dark-field illumination can more easily be distinguished from the specimen image by the bright-field illumination by flickering the dark-field illumination light at the predetermined interval. When a concavo-convex shape such as a flaw is formed on the specimen, in particular, the concave-convex shape is flickered by flickering the dark-field illumination light, so that the concavo-convex shape can easily be distinguished. When the dark-field illumination light is flickered, the AE function is turned off to fix the exposure time.

In the above-mentioned embodiments, it is preferable that the light quantity during the image capture is the maximum value of the set illumination intensity in the imaging processes in steps S101 and S102 in the illumination intensity adjusting process illustrated in FIG. 5. This process can provide an image optimized with the maximum illumination intensity of the light source.

In the above-mentioned embodiments, the microscope system including the microscope apparatus, the imaging apparatus, the display input unit, and the control terminal is described as one example. However, the present invention is applicable to an imaging apparatus, such as a video microscope, including a bright-field illumination unit, a dark-field illumination unit, an objective lens that magnifies a specimen, an imaging function for capturing a specimen through the objective lens, and a display function of displaying an image.

In the above-mentioned embodiments, the upright microscope apparatus is described as the microscope apparatus. However, the present invention is applicable to an inverted microscope apparatus. The present invention is also applicable to various systems such as a line apparatus having the microscope apparatus incorporated therein.

In the above-mentioned embodiments, the display input unit and the control terminal are provided separately. However, a portable terminal having the display input unit and the control terminal integrally formed may be used.

As described above, the microscope system and the illumination intensity adjusting method according to the present invention is useful for automatically adjusting an illumination intensity, when the bright-field illumination system and a dark-field illumination system are simultaneously used.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A microscope system comprising:
    a stage on which a specimen is placed;
    an objective lens that converges observation light from at least the specimen on the stage;
    a bright-field illumination unit configured to emit bright-field illumination light that is illumination light applied to the specimen for a bright-field observation;
    a dark-field illumination unit configured to emit dark-field illumination light that is illumination light applied to the specimen for a dark-field observation;
    an illumination intensity control unit configured to adjust an illumination intensity of one of the bright-field illumination light and the dark-field illumination light based on an illumination intensity of the other of the bright-field illumination light and the dark-field illumination light; and
    a control unit configured to execute a simultaneous irradiation process by controlling the bright-field illumination unit and the dark-field illumination unit to simultaneously emit the adjusted bright-field illumination light and the adjusted dark-field illumination light, respectively, after the illumination intensity has been adjusted by the illumination intensity control unit.

2. The microscope system according to claim 1, further comprising:
    an imaging unit configured to capture an image of the specimen to which the bright-field illumination light and the dark-field illumination light are respectively applied,
    wherein the illumination intensity control unit adjusts the illumination intensity based on a ratio of exposure times when the imaging unit captures the image of the specimen to which the bright-field illumination light is applied and when the imaging unit captures the image of the specimen to which the dark-field illumination light is applied.

3. The microscope system according to claim 2, wherein the illumination intensity control unit adjusts the illumination intensity of the one of the bright-field illumination light and the dark-field illumination light which has a shorter exposure time than the other of the bright-field illumination light and the dark-field illumination light.

4. The microscope system according to claim 1, further comprising an input unit configured to accept input of a ratio of the illumination intensity of the bright-field illumination light and the illumination intensity of the dark-field illumination light.

5. The microscope system according to claim 4, wherein the input unit comprises a touch panel.

6. An illumination intensity adjusting method comprising:
    irradiating a specimen placed on a stage with dark-field illumination light that is illumination light for a dark-field observation to capture a first image of the specimen;
    irradiating the specimen with bright-field illumination light that is illumination light for a bright-field observation to capture a second image of the specimen;
    adjusting an illumination intensity of one of the dark-field illumination light and the bright-field illumination light based on a ratio of exposure times when the first image of the specimen is captured in the dark-field imaging and when the second image of the specimen is captured in the bright-field imaging; and
    after the adjusting the illumination intensity, executing a simultaneous irradiation process by simultaneously emitting the adjusted bright-field illumination light and the adjusted dark-field illumination light.

* * * * *